M. B. LLOYD.
TUBE WELDING MACHINE.
APPLICATION FILED OCT. 29, 1913.

1,124,763.

Patented Jan. 12, 1915.
4 SHEETS—SHEET 1.

Witnesses
Valois E. Messier
Arthur Wilson

Inventor
Marshall B. Lloyd
By
Attorney

M. B. LLOYD.
TUBE WELDING MACHINE.
APPLICATION FILED OCT. 29, 1913.

1,124,763.

Patented Jan. 12, 1915.

Witnesses
Inventor
Marshall B. Lloyd

M. B. LLOYD.
TUBE WELDING MACHINE.
APPLICATION FILED OCT. 29, 1913.

1,124,763.

Patented Jan. 12, 1915.
4 SHEETS—SHEET 3.

Witnesses
Valois E. Messier
Arthur W. Wilson

Inventor
Marshall B. Lloyd
by
Attorney

UNITED STATES PATENT OFFICE.

MARSHALL BURNS LLOYD, OF MENOMINEE, MICHIGAN, ASSIGNOR, BY MESNE ASSIGNMENTS, TO THE ELYRIA IRON & STEEL COMPANY, OF ELYRIA, OHIO, A CORPORATION OF OHIO.

TUBE-WELDING MACHINE.

1,124,763.  Specification of Letters Patent.  Patented Jan. 12, 1915.

Application filed October 29, 1913. Serial No. 798,128.

*To all whom it may concern:*

Be it known that I, MARSHALL B. LLOYD, a citizen of the United States, and a resident of Menominee, county of Menominee, and State of Michigan, have invented certain new and useful Improvements in Tube-Welding Machines, of which the following is a specification.

My invention relates generally to improvements in machines for manufacturing metal tubing, and has special reference to machines for welding the seams of metal tubes which have been previously formed.

The general object of my invention is to provide a machine wherewith the seam of a preformed metal tube may be welded or closed by simply heating a portion of the tube contiguous the seam and a further object is to provide a machine wherewith preformed metal tubes may be welded economically and rapidly at a substantially uniform rate of speed, and wherewith it shall be possible quickly and easily to adjust the machine for welding tubes and other elongated articles varying greatly in size and shape.

Other objects of my invention are to improve the means for holding the tube and conveying it under the welding flame and to provide means for counteracting the tendency of the welding flame to twist or bow the tube to the end that it shall emerge perfectly straight and true.

My invention consists, generally, in the construction and combination of parts hereinafter described and claimed; and will be more readily understood by reference to the accompanying drawings forming a part of this specification, and in which:—

Fig. 3 is an end elevation viewed from the driving end.

Metallic tubing of the kind which I contemplate welding is usually made by rolling or forming up a long strip of metal which when formed is characterized by a longitudinal split or open seam, the edges thereof being in substantial abutment. The general purpose of my invention is to unite these abutting portions uniformly, rapidly, and economically, and to do this in a manner which will not destroy or materially change the form or texture of the metal. This I accomplish by placing the tube in a holder which exposes the seam of the tube and by moving the holder longitudinally at uniform speed under a welding torch which impinges a narrowed or localized flame upon the seam, causing the edges to run together or weld as fast as the tube passes the torch. Because of the narrowed or localized action of the flame and the relatively large jaws which grip the tube, the heating of the tube is limited practically to a small zone contiguous to the seam, and because of the free passage of air around the tube it is quickly returned to the cold state in which it approached the torch. Hence the tube as a whole is not materially raised in temperature, the application of the intense heat being purely temporary as to each point along the seam with the result that the tube emerges from the welding operation without any serious change in its formation or texture.

In many shops, particularly in the smaller shops, work of various sizes and shapes is welded upon the same machine. This requires that the position and sometimes the shape of the parts be frequently changed. For instance, when welding different size tubes not only must the position of the conveyers be changed, but to secure the best welding action the shape of the jaws should also be changed substantially to conform to the article to be welded. Hence it is one of the purposes of my invention to provide a machine, the parts of which may be readily and easily positioned or changed as necessary in welding articles of different size and shape, and also so to construct the parts that the gripping portions may be quickly removed and the conveyer equipped with properly shaped gripping members. Another purpose of my invention is to so construct the machine that the changed position of the conveyers resulting from a wide range of adjustment shall not change the effect of the working stretch nor the path which the conveyers follow as they move into and from working position. My novel machine herein shown for accomplishing these objects comprises a strong table A, supported at convenient height upon legs $a$. The table A is provided at each end with two transverse parallel V-grooves 2 and slidably arranged and supported therein are two conveyer or pressure element supports B. Each of the conveyer or pressure element supports is essentially the same, and comprises a single elongated casting 3 having similar end portions 4—4 provided with V-projections 5 for complementary engagement with the V-grooves 2 of the table. The central portion 6 is raised and the upper part thereof is finished for the proper mounting of the pressure elements and conveyers.

I provide two similar pressure elements 8—8 which are substantially the length and width of the raised portion 6 upon which they are supported. They are bolted to their supports in opposed parallel relation. At the ends of the pressure elements I provide sprocket wheels 13 and upon the sprocket wheels and pressure elements I arrange endless chains or conveyers C—C and by means hereinafter to be described the conveyers are moved continuously in a cycle. By means of the pressure elements, portions of the chains or conveyers are successively pressed firmly upon the tube thereby serving to forward it and also to apply pressure sufficient to join the edges of the tube and close the seam of the tube as it passes under the welding torch. This mechanism, it should be understood, must be capable of applying pressure of various magnitudes on the tube as may be necessary in welding tubing of different sizes, thickness or metal texture, and also must be capable of adjustment to grip and convey tubes and other elongated articles varying greatly in size and shape. In order that my invention may be fully understood and that the mechanism by which I accomplish these ends be readily understood, I shall describe these parts in detail. The pressure elements 8, 8 are formed with side portions 9, 9 containing two longitudinal V-shaped recesses 10—10. Upon the ends of the elements 8—8, I secure brackets 11—11' having spaced outer bearings 12, 12' in each of which I mount a sprocket wheel 13, by means of vertically disposed shafts. The conveyers comprise a plurality of identical members 20, which can be conveniently formed of cast iron and which are joined by studs or pins 21 to form endless chains. The studs which link them together carry rollers 22 above and below for complementary engagement with the sprocket wheels, whereby the friction is reduced to a minimum. It is desirable and necessary particularly when operating upon thin-walled tubing to be extremely careful when gripping the tube that the jaws do not indent or mar the surface thereof. Considerable difficulty has hitherto been encountered in providing simple and cheap mechanism which will act to grip the tube and apply pressure thereto sufficient to close the seam when raised to welding temperature, and which at the same time will not indent or mar the tube.

I find by experimentation and research that one of the prime factors necessary in gripping the tube to prevent any indentation or marring thereof is that the vise jaws shall be perfectly alined and parallel with the tube before pressure is applied for gripping the tube and compressing it with force sufficient to unite the heated seam of the tube. In other words, if the vise jaws approach the work at an angle and pressure is applied when the jaws are in this angular position, the edges thereof first contact the tube and little pressure is necessary to mar the tube. Another factor which I find to be of importance is that after the tube has been gripped, the vise jaws should be limited to rectilinear movement until the pressure is relieved. To accomplish these ends, I provide the inner side of each of the chain links with two projections 30—30 for coöperation with the V-grooves 10—10 of the pressure elements. By this means the vise jaws are limited firmly and positively to rectilinear movement.

In order that the conveyers may be put under proper tension, I make the sprocket carrying brackets 11' adjustable and to permit movement thereof I secure them to the pressure elements by tap bolts 11'' which operate in elongated slots 11'''. I extend from the base of the brackets a threaded member $11^2$ which, coöperating with the nuts and standards $11^3$ and $11^4$ respectively, serves as a means of moving the brackets. After the brackets are moved to proper position the bolts are, of course, tightened to hold them against movement.

As before stated, in order to secure the proper pressure and also to adapt the conveyers to articles of different sizes and shapes, I make the conveyers freely movable to and from each other. To do this without disturbing the working relation of the parts, i. e., without disturbing the working relation of the parts in and on each of the pressure elements, I make the frames upon which the conveyers are mounted movable and in order that this may be conveniently and quickly done, I provide beneath the machine a transverse rod 83 (best shown in Fig. 5). The rod 83 is provided with right and left hand threaded portions 84 and 85 which operate in threaded bushings 86 of the conveyer or pressure element carrying frames. The central portion 87 of the rod 83 engages a bracket 84$^x$ which prevents transverse movement of the screw. Hence to move the conveyers to and from the center it is but necessary to rotate the screw 83. In order to secure the conveyer carrying frames against movement when properly adjusted, I secure them to the table of the machine by bolts 90 which operate in elongated slots 91.

Figure 4:
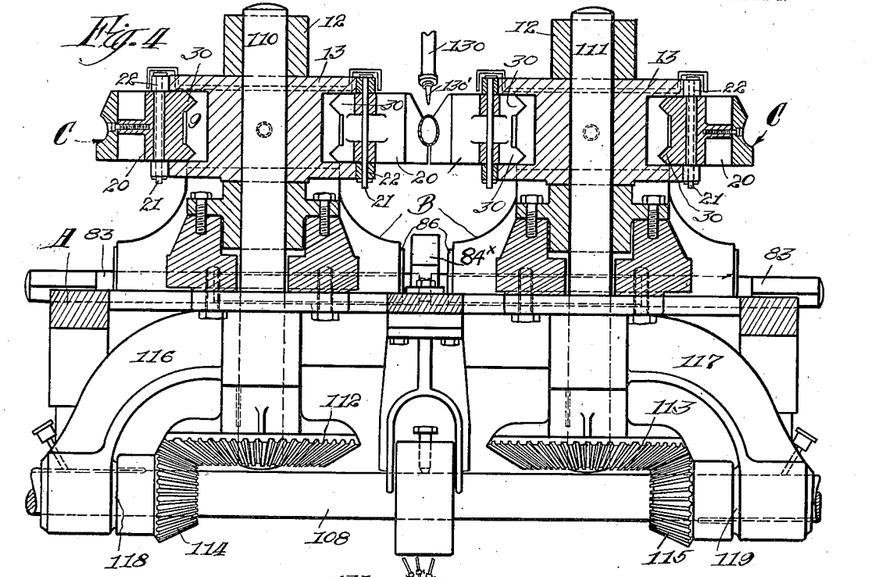
Fig. 4 is an enlarged cross-sectional view substantially on the line 4—4 of Fig. 1 showing the means for driving the conveyers.

*The driving mechanism.*—The power may be supplied from any suitable source and I have indicated a power pulley 100 to be driven thereby. The pulley 100 is attached to and drives a shaft 101 to which a gear 102 is secured. Motion of the gear 102 is transmitted to the gear 104 on the shaft 105 by means of the idler gear 103. On the shaft 105 I mount a worm 106 which meshes with a worm wheel 107 mounted upon a cross shaft 108. The arrangement and construction of the cross shaft and the means by which power therefrom is imparted to the conveyers will be best understood by reference to Fig. 4. It will there be seen that depending from the sprocket wheels and secured thereto are vertical shafts 110 and 111 carrying at their lower ends bevel gears 112 and 113. Upon cross shaft 108 I feather bevel pinions 114 and 115 to drive the bevel gears 112 and 113. As the vertical shafts 110 and 111 will be carried to and from the center of the machine when the conveyers are adjusted, it is necessary to provide means for maintaining the driving relation between the gears 112, 113, 114 and 115. For this purpose I arrange L-shaped brackets 116 and 117 on the vertical shafts which extend into engagement with the cross shaft 108 and have bearings through which the cross shaft 108 projects. By this construction the pinions on the cross shaft 108 are moved at the same speed as the bevel gears on the vertical shafts and, of course, the proper driving relation is always maintained. It will, of course, be understood that the bearing portions 118 and 119 of the L-shaped brackets serve to move the pinions toward the center of the machine and that the bevel gears on the vertical shafts serve to move them from the center.

Figures 5, 6, 7, 8, 9:
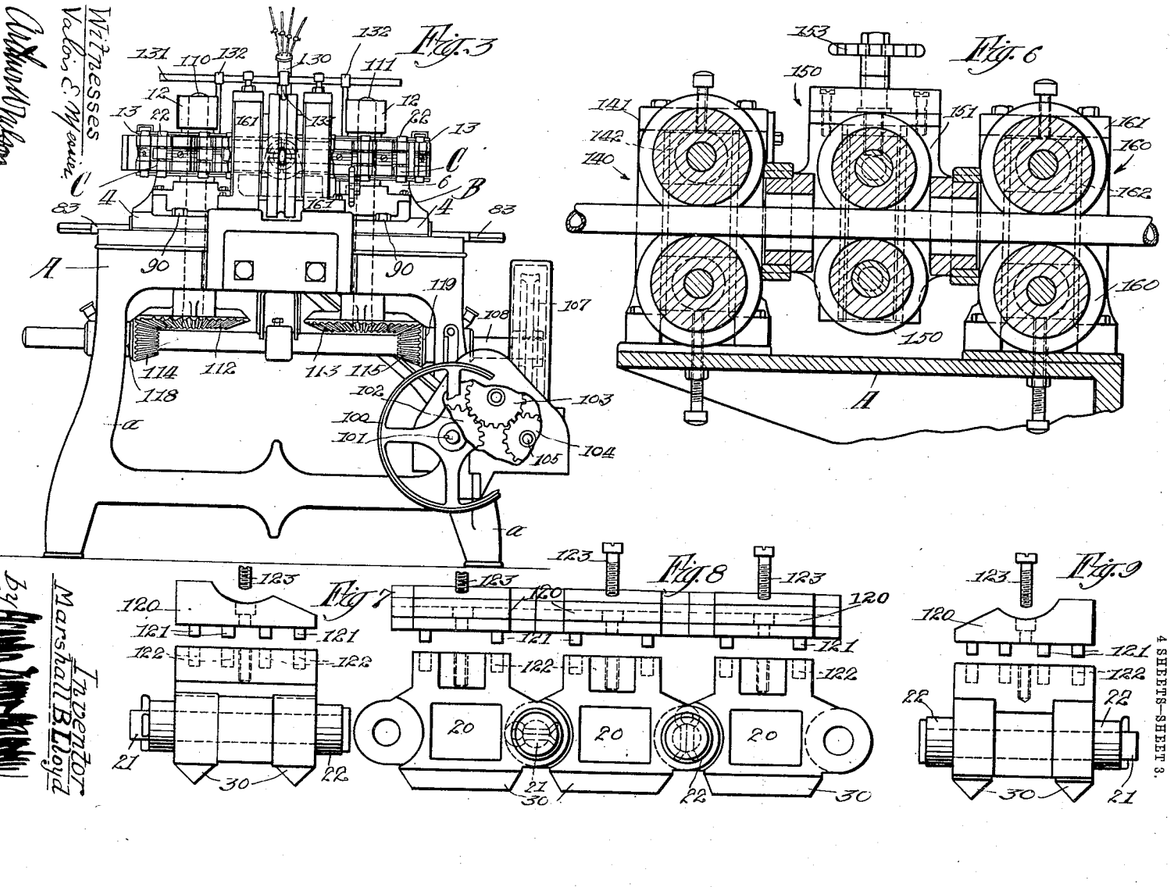
Fig. 5 is an enlarged cross-sectional view substantially on the line 5—5 of Figs. 1 and 2 and illustrates the means for moving the conveyers to and from each other for the purpose of securing the desired pressure upon the article or for clamping articles of different sizes.
Fig. 6 is an enlarged detail view substantially on the line 6—6 of Fig. 1, but showing the central rolls thereof in a different position.
Figs. 7, 8 and 9 are detail views of portions of the tube conveyer illustrating the construction thereof and particularly the easy removability and construction of the tube-clamping portions of the conveyer.
Figure 5:
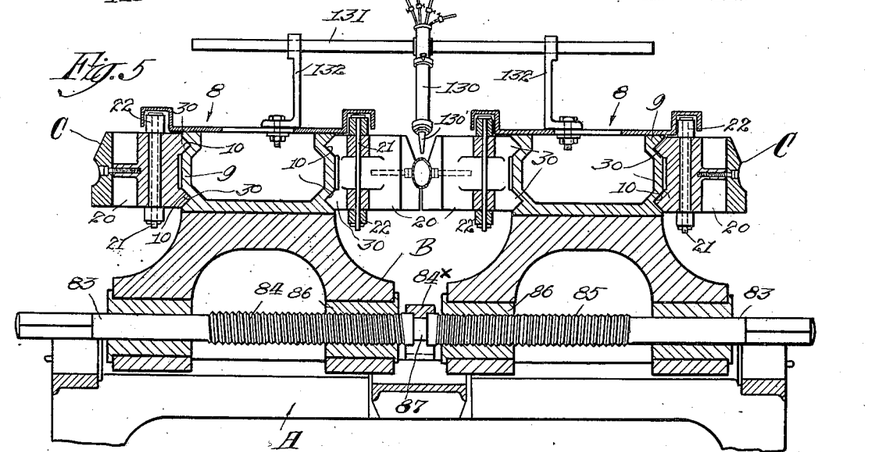

When the tubes of different sizes are to be welded, I prefer to make the conveyer with jaws conforming to the shape of the article to be welded. For this reason I make the gripping portion of the conveyer removable as is best shown in Figs. 7, 8 and 9. It will be seen by reference to those figures that each of the chain links 20 has secured thereto a removable gripping face 120. In order that the gripping portion shall be positively prevented from rotation or any movement whatsoever relative to the link upon which it is mounted, I provide same with a number of dowel pins 121, for complementary engagement with recesses 122 in the conveyer link. A single stud screw 123 serves therefore firmly to attach the gripping jaws to the conveyer link against any relative movement thereon. Hence by having a number of properly shaped jaws the conveyer can be quickly provided therewith, since the removal of a single screw permits removal of the gripping face from each link, and a single machine can thereby be quickly adapted to weld articles varying greatly in size and shape.

Figures 1, 10, 11, 12:
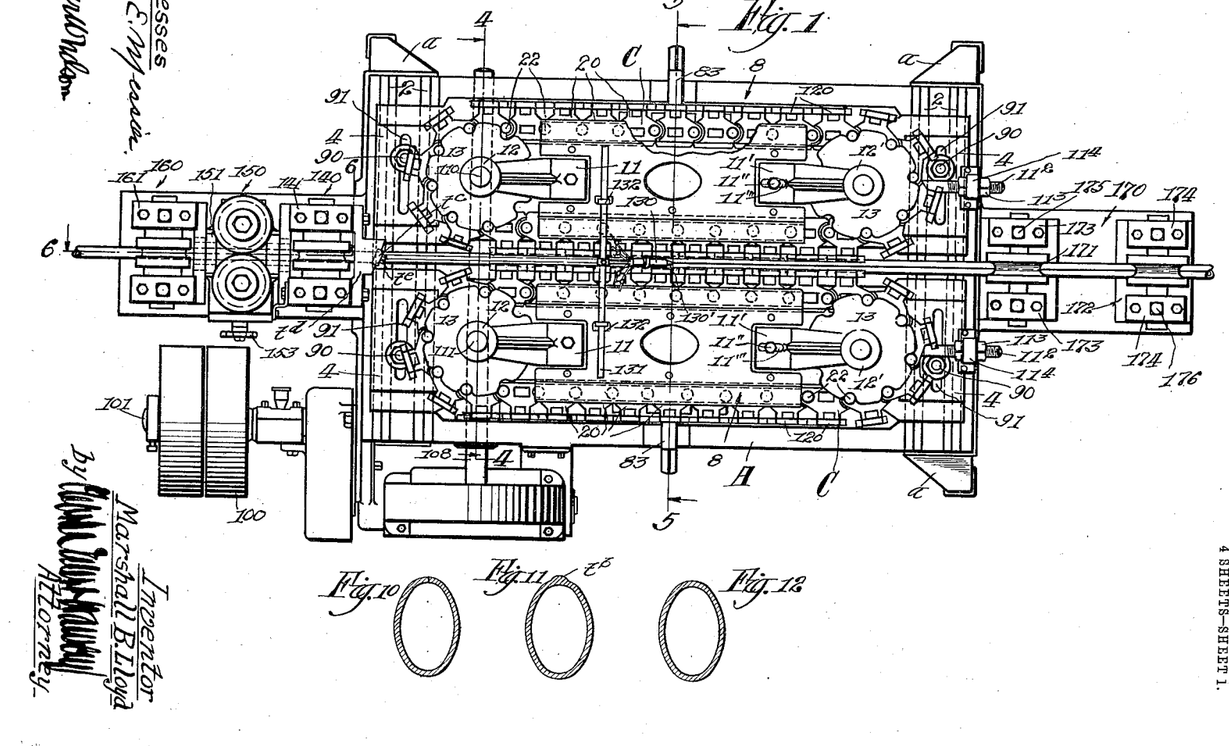
Figure 1 is a plan view of my novel welding machine.
Fig. 10 is a cross-sectional view of the tubing before it is welded.
Fig. 11 is a view thereof after the tube is welded and showing the raised seam or bur somewhat exaggerated.
Fig. 12 is a view of the tube after it has passed the bur-removing mechanism.
Figure 2:
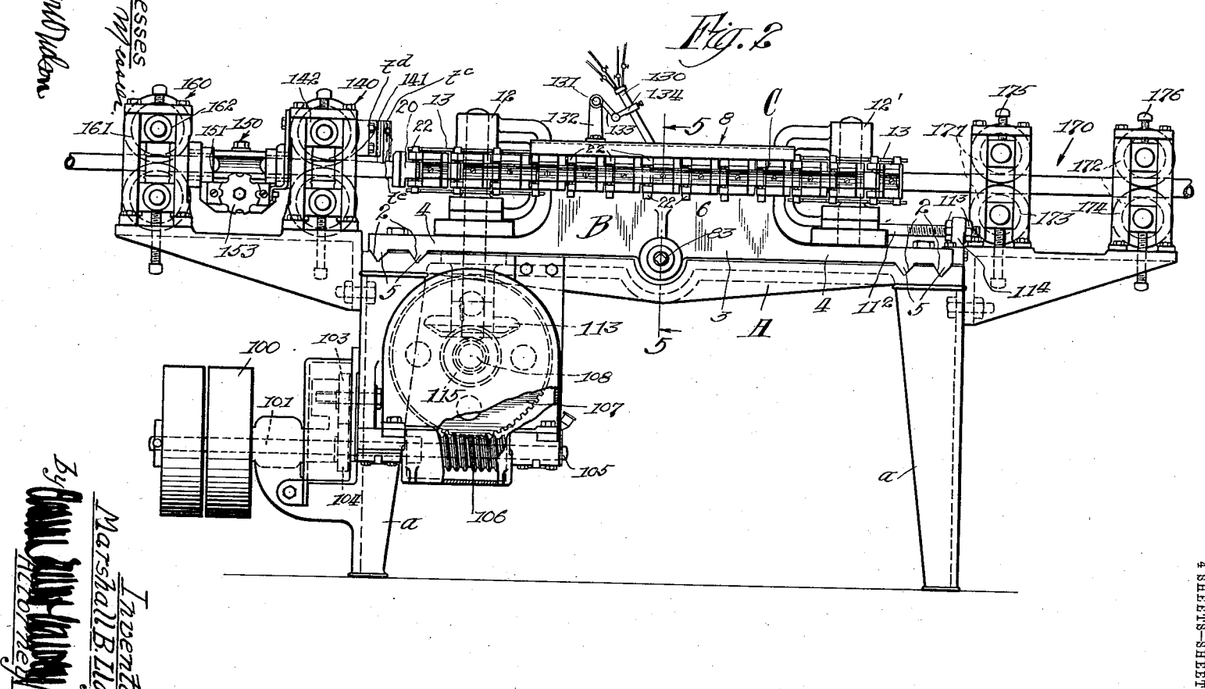
Fig. 2 is a side elevation thereof.

*The heating means.*—For raising the tube to welding temperature various means may be employed, but I find that an oxy-acetylene torch is best adapted for the rapid and economical welding of most articles. I therefore provide a torch 130 which is mounted preferably midway of the machine both longitudinally and transversely considered. The cross shaft 131 held in bearings or brackets 132 serves to support the torch. In order that proper adjustment of the torch may be secured I mount it upon the cross shaft by means of pivoted arms 133 and 134. The torch carries at its end a nozzle 130′ which is formed to direct a fine or narrow flame upon the tube, thereby confining the flame to the portion of the tube contiguous to the seam, and practically heating only the part upon which it impinges. During the welding operation a small raised seam or bur $t^b$ is formed. (See Fig. 11). In order that the finished tube may be smooth and uniform, I prefer to remove this bur. For this purpose I provide a tool or blade $t^c$ positioned in alinement with the tubing, and which conforms substantially to the top thereof. The tool is arranged at an angle to the axis of the tubing and is rigidly held in a block or bracket $t^d$ which may be supported by any suitable means such as the standards 141. The tool is vertically adjustable and is fixed in place by a stud screw $t^e$. As the tubing travels beneath the sharp edge of the planer tool, the latter cuts or scrapes off the bur leaving the top of the tubing as smooth as the other surfaces thereof (see Fig. 12) and making the seam practically invisible. The tubing, as it emerges from the constraining influence of the conveyers has a tendency to curl or bend. This is dependent largely upon the speed of the tube, its thickness, the length of confinement between the rigid holding means, the texture of the metal, the character of the welding flame, and other similar factors. I find that with a conveyer of practical length the tubing usually emerges bent or slightly bowed, and in some instances enough to prevent its commercial use. For this reason I provide means for straightening or applying to the tube forces which will prevent it from curling or bowing when released from the constraining influence of the conveyer.

*Tube straightening means.*—My unique mechanism for this purpose comprises three pairs of coacting rolls 140, 150 and 160. The rolls 140 and 160 are mounted respectively in standards 141 and 161, by means of sliding bearing blocks 142 and 162. These rolls 140 and 160 are conformed substantially to the tube and are limited to straight line movement in the standards. Between rolls 140 and 160 I mount the pair of rolls 150. These are carried in a frame 151 and are movable therein as a unit, and the frame 151 is trunnioned in the standards 141 and 161 and can thereby be swung to any desired angular position. The operation of the straightening device is as follows: For example, if the tube upon emerging from the conveyer has a tendency to bow upwardly the center pair of rolls can be swung around to the proper angular position and by means of the hand wheel 153 moved as a unit to exert a pressure upon the tube which will counteract this bending or bowing force with the result that the tube will emerge therefrom perfectly straight. It will, of course, be understood that the rolls move concentrically around the tube. By this means even slight bending effects which are not sufficient to destroy the commercial value of the article can be rectified thereby, improving its appearance, and making it more convenient to handle. I also prefer to provide means for presenting the tube properly to the conveyers, and for this purpose provide means 170 at the forward end. The tube here shown is one of oval or elliptical cross-section with the seam thereof at one end of the major axis. For such a tube one or more pairs of properly shaped rolls would serve well to guide the tube to the conveyer with the seam thereof in proper position for the welding torch. I have therefore indicated two pairs of guide rolls, 171 and 172, which are suitably mounted in standards 173 and 174. Adjustment thereof may be had by means of adjusting screws 175 and 176. By this means the proper presentation of the tube seam to the welding torch is assured.

From this detailed description it is believed that the objects and advantages of my novel welding machine will be apparent to those skilled in the welding art. However, since such men will readily conceive of modified structures embodying my invention, I do not wish to be limited to the specific constructions shown and described, except as may be necessary by express limitations in the claims hereunto appended.

I claim:—

1. In a tube welder, a cyclically moving holder for moving a tube forward comprising two opposed adjustable pressure elements and an endless chain carried by each pressure element for movement therewith as a whole and for cyclical movement thereon, in combination with a stationary burner arranged to play a flame upon the tube and weld the seam as fast as the tube travels.

2. In a welding machine a cyclically moving vise for moving a tube forward, comprising two opposed pressure elements adjustable to and from each other, a cyclic vise chain carried by each pressure element and arranged to move around the same, means for moving the pressure elements to and from each other, in combination with a torch for raising the tube to welding temperature.

3. In a welding machine, the combination of a cyclically moving vise for moving a tube forward, comprising two adjustable pressure elements, a cyclic conveyer mounted upon each pressure element and movable as a whole therewith and cyclically thereon, means for driving the vise, and a welding torch positioned to play a flame upon the tube.

4. In a tube welding machine the combination of two elongated pressure elements movable to and from each other, a cyclic vise carried by said pressure elements and comprising an endless chain mounted upon each pressure element for movement therewith as a whole and for cyclical movement thereon, the chains coacting successively to grip and forward a tube, means for moving the pressure elements to and from each other, means for driving the endless chains and a welding torch arranged to direct a flame upon the tube in said vise.

5. In a tube welding machine the combination of a cyclically moving vise comprising two opposed adjustable pressure elements, an endless chain on each pressure element movable as a whole therewith and cyclically around the same, means for limiting the chains to rectilinear movement when in engagement with one stretch of the pressure elements and a welding torch mounted to direct a flame between the opposed pressure elements.

6. In a welding machine the combination of a cyclically moving vise for forwarding a tube, comprising two adjustable pressure elements, a cyclic conveyer mounted upon each pressure element movable as a whole therewith and cyclically thereon, means for limiting the conveyers to rectilinear movement when in engagement with one stretch of the pressure elements, means for imparting motion to said conveyers, and a welding torch mounted to direct a flame between the opposed pressure elements.

7. In a welding machine the combination of a cyclically moving vise for moving a tube forward, comprising two opposed pressure elements adjustable to and from each other, an endless chain carried by each pressure element, arranged to move with the same as a whole and cyclically thereon, means for limiting the chains to rectilinear movement when in engagement with one stretch of the pressure elements, means for imparting motion to said chains, means for moving the pressure elements to and from each other, and a welding torch mounted to direct a flame upon the tube between the chains.

8. In a tube welder the combination of a cyclically moving holder for moving a tube forward, comprising two opposed adjustable pressure elements, an endless chain mounted upon each pressure element and moving as a whole therewith and cyclically thereon, means for presenting the tube to said cyclically moving holder, and a welding torch mounted over the conveyer in position to impinge a flame upon the tube.

9. In a tube welder a cyclically moving holder for moving a tube forward, comprising two opposed elongated adjustable pressure elements movable to and from each other, an endless chain carried by each pressure element for movement as a whole therewith and cyclically thereon, means for presenting a tube to the moving holder, means for moving said pressure elements to and from each other, in combination with a welding torch positioned to play a flame upon the tube in the moving holder.

10. In a tube welder, a cyclically moving holder for moving a tube forward, comprising two opposed adjustable pressure elements, an endless chain carried by each pressure element for movement as a whole therewith and cyclically thereon, means for imparting motion to said chains, means for presenting a tube to the moving holder, in combination with a welding torch mounted over the conveyer and positioned to play a flame upon the tube therein.

11. In a tube welding machine, the combination of a cyclically moving holder for forwarding a tube comprising two opposed adjustable pressure elements, an endless chain carried by each pressure element for movement therewith as a whole and cyclically thereon, means for moving the pressure elements to and from each other, means for imparting motion to said chains, means for presenting a tube to the moving holder and a welding torch positioned to raise the tube to welding temperature when moving with said holder.

12. In a tube welding machine, the combination of a cyclically moving holder for forwarding a tube, comprising two opposed adjustable pressure elements and an endless chain carried by each pressure element for movement therewith as a whole and cyclically thereon, means for presenting a tube to said moving holder, means for limiting the endless chains to rectilinear movement when in engagement with one stretch of the pressure elements, and a welding torch arranged over the pressure elements and positioned to project a welding flame upon the tube.

13. The improvements herein described, comprising an endless single direction traveling vise, consisting of two opposed pressure elements and an endless chain carried by each pressure element movable as a whole therewith and cyclically thereon, means for imparting continuous motion to said chains, means for presenting a tube to said moving holder, means for limiting the chains to rectilinear movement when in the working stretch, and a welding torch arranged over the pressure elements and adapted to project a welding flame upon the tube.

14. In a welding machine the combination of a traveling vise for holding and propelling a tube longitudinally forward with seam exposed, said vise comprising two opposed pressure elements and an endless chain mounted upon each pressure element for movement as a whole therewith and cyclically thereon, means for imparting continuous motion to said chains, means for moving said pressure elements to and from each other, means for presenting a tube to the traveling vise, means for limiting the endless chains to rectilinear movement in the working stretch, and a welding torch arranged over the pressure elements and adapted to project a welding flame upon the tube.

15. In a tube welder, mechanism for moving the tube in a longitudinal direction with the seam thereof exposed, a welding torch positioned to impinge a flame upon the tube as it travels and progressively weld the seam, in combination with means for straightening the tube as it emerges from the tube moving and welding means.

16. In a tube welding machine the combination of a cyclically moving holder for imparting longitudinal movement to a tube, means for presenting a tube to said cyclically moving holder, a welding torch positioned to play a flame upon and weld the tube, and means for straightening the tube as it emerges from the tube forwarding and welding means.

17. The improvements herein described comprising a traveling sectional vise formed of two opposed pressure elements, each thereof carrying an endless chain mounted for movement as a whole therewith and cyclically thereon, means for presenting a tube to said traveling sectional vise, means for moving the pressure elements to and from each other, a welding torch positioned to play a flame upon and weld the tube as it moves with the traveling vise, and means for straightening the tube as it emerges therefrom.

18. In a tube welding machine, the combination of a cyclically moving holder for moving a tube forward, comprising two opposed adjustable pressure elements and an endless chain carried by each pressure element for movement as a whole therewith and cyclically thereon, means for imparting continuous movement to said chains, means for presenting a tube to the moving holder, a welding torch arranged to play a flame upon the welded tube as it travels, and means for straightening the tube as it emerges from the conveying means.

19. In a tube welder, the combination of a cyclically moving holder for moving a tube forward comprising two opposed adjustable pressure elements and an endless chain carried by each pressure element for movement as a whole therewith and cyclically thereon, means for imparting continuous movement to the chains, means for properly presenting a tube to the moving holder, means for moving the pressure elements to and from each other, a welding torch positioned to act upon the tube in the moving holder, and means for straightening the tube as it emerges therefrom.

20. In a machine of the class described, the combination of a traveling vise comprising two opposed pressure elements and an endless chain mounted upon each pressure element for movement as a whole therewith and cyclically thereon, means for presenting the tube to the traveling vise, means for limiting the chains to rectilinear movement in the working stretch, a welding torch positioned to act upon the tube in the vise, and means for straightening the tube as it emerges therefrom.

21. The herein described tube welder comprising in combination a moving vise consisting of two opposed adjustable pressure elements and an endless chain mounted upon each pressure element for movement as a whole therewith and cyclically thereon, means for imparting continuous movement to said chains, means for presenting a tube to the moving vise, means for limiting the chains to rectilinear movement during engagement with one stretch of the pressure elements, a welding torch positioned to act upon the tube in the moving vise, and means for straightening the tube as it emerges therefrom.

22. In a machine of the class described, the combination of a cyclically moving holder for moving a tube forward, comprising two opposed adjustable pressure elements and an endless chain carried by each pressure element for movement as a whole therewith and cyclically thereon, means for imparting continuous movement to said chains, means for moving the pressure elements to and from each other, means for presenting the tube to the moving holder, means for limiting the holder to rectilinear movement during engagement with one stretch of the pressure elements, a welding torch positioned to play a flame upon the tube in the moving holder, and means for straightening the tube as it emerges therefrom.

23. In a machine for welding tubing and the like, the combination of a cyclically moving holder for moving a tube forward, comprising two opposed adjustable pressure elements and an endless chain carried by each pressure element for movement as a whole therewith and cyclically thereon, means for imparting continuous motion to said chains, means for moving said pressure elements to and from each other, means for presenting a tube to said moving holder, means for limiting the chains to rectilinear movement when in engagement with one stretch of the pressure elements, a welding torch arranged over the pressure elements and adapted to project a welding flame upon the tube, and means for straightening the tube as it emerges from the moving holder.

24. In a welding machine the combination of a cyclically moving holder for moving a tube forward, comprising two opposed pressure elements and an endless chain carried by each pressure element, complementary co-acting grooves and projections on said pressure elements and chains for limiting the links to rectilinear movement in the working stretch, and a welding torch positioned to play a welding flame upon a tube in the moving holder.

25. In a welding machine the combination of two opposed pressure elements, a cyclic vise comprising a number of links mounted upon and carried by each of said pressure elements, complementary co-acting grooves and projections on said pressure elements and links for limiting the links to rectilinear movement in the working stretch, means for moving the pressure elements to and from each other, and a welding torch arranged over the vise and positioned to project the flame upon the tube.

26. In a welding machine the combination of two opposed pressure elements, a cyclic vise comprising a number of links mounted upon and carried by each of said pressure elements, complementary co-acting grooves and projections on said pressure elements and links for limiting the links to rectilinear movement in the working stretch, means for imparting continuous movement to the cyclic vise, and means for raising the tube to welding temperature.

27. In a welding machine the combination of two opposed pressure elements, a cyclic vise comprising a number of links mounted upon and carried by each of said pressure elements, complementary co-acting grooves and projections on said pressure elements and links for limiting the links to rectilinear movement in the working stretch, means for imparting continuous movement to said cyclic vise, means for moving the pressure elements to and from each other, and a burner for playing a welding flame upon a tube.

28. In a welding machine the combination of a cyclically moving holder comprising two opposed pressure elements, and a chain carried by each pressure element, complementary grooves and projections on said pressure elements and links of the chains for limiting the chains to rectilinear movement in the working stretch, means for presenting a tube to the moving holder, and means for raising the tube to welding temperature.

29. In a welding machine of the class described the combination of two opposed pressure elements, a cyclic vise comprising a number of links mounted upon and carried by each of said pressure elements, complementary co-acting grooves and projections on said pressure elements and links for limiting the links to rectilinear movement in the working stretch, means for moving the pressure elements to and from each other, means for presenting a tube to the cyclic vise and a torch positioned to play a flame between the pressure elements.

30. In a welding machine the combination of a cyclically moving holder comprising two opposed pressure elements, an endless chain mounted upon each of said pressure elements, complementary co-acting grooves and projections on said pressure elements for limiting the chains to rectilinear movement in the working stretch, means for presenting a tube to the moving holder, means for imparting continuous movement to the chains, and a welding torch for heating the tube.

31. In a welding machine the combination of a traveling conveyer comprising two opposed elongated pressure elements movable to and from each other and an endless chain mounted upon each of the pressure elements for movement as a whole therewith and cyclically thereon, means for moving said pressure elements to and from each other, means for presenting the tube to the conveyer, complementary grooves and projections upon said pressure elements, and means for limiting the chains to rectilinear movement in the working stretch, and means for raising the tube to welding temperature.

32. In a device of the class described, the combination of two opposed pressure elements, an endless cyclically moving chain mounted upon and carried by each of said pressure elements, means for presenting a tube to the moving chains, complementary co-acting grooves and projections upon said chains and pressure elements for limiting the links of the chain to rectilinear movement therein, means for raising the tube to welding temperature, and means for straightening the tube as it emerges from the vise.

33. In a tube welding machine the combination of two opposed pressure elements, a cyclic chain mounted upon and carried by each of said pressure elements, means for presenting a tube thereto, means for moving the pressure elements to and from each other, a torch mounted over the vise and positioned to project a flame upon the tube, and means for straightening the tube as it emerges from the vise.

34. In a tube welding machine the combination of two opposed pressure elements, a cyclic vise comprising a number of links mounted upon and carried by each of said pressure elements, means for presenting a tube to the vise, means for imparting continuous movement thereto, other means for moving the pressure elements to and from each other, complementary co-acting grooves and projections on said pressure elements and links for limiting the movement of the vise to rectilinear motion in the working stretch, a torch for applying a welding flame to the tube, together with means for straightening the tube as it emerges from the welding operation.

35. In a tube welding machine, a cyclically moving holder comprising two elongated pressure elements and an endless chain carried by each pressure element, means for imparting continuous movement to the endless chains, means for moving the pressure elements to and from each other, a burner for playing a welding flame upon the tube, and mechanism automatically actuated with the movement of the pressure elements to maintain the driving relation between the source of power and the endless chains.

36. In a welding machine the combination of two opposed elongated pressure elements mounted for movement to and from each other, a pair of sprocket wheels carried by each of said pressure elements, an endless chain mounted for cyclic movement upon the pressure elements and around said sprocket wheels, grooves and projections upon said pressure elements and means for limiting the chains to rectilinear movement along one portion of the pressure elements, and a torch mounted on the pressure elements.

37. In a welding machine the combination of two opposed elongated pressure elements mounted for movement to and from each other, a pair of sprocket wheels carried by each of said pressure elements, an endless chain mounted for cyclic movement upon the pressure elements and around said sprocket wheels, grooves and projections upon said pressure elements and means for limiting the chains to rectilinear movement along one portion of the pressure elements, means for moving the pressure elements and sprocket wheels to and from each other, and a welding torch mounted over the pressure elements, as and for the purpose specified.

38. In a tube welding machine the combination of two opposed elongated pressure elements mounted for movement to and from each other, a pair of sprocket wheels carried by each of said pressure elements, an endless chain mounted for cyclic movement upon the pressure elements and around said sprocket wheels, grooves and projections upon said pressure elements and means for limiting the chains to rectilinear movement along one portion of the pressure elements, means for moving the pressure elements and sprocket wheels to and from each other, together with means for imparting motion to said chains and for maintaining the driving connection irrespective of the position of the pressure elements, and a torch for raising the tube to welding temperature.

39. In a welding machine the combination of two opposed elongated pressure elements mounted for movement to and from each other, a pair of sprocket wheels carried by each of said pressure elements, an endless chain mounted for cyclic movement upon the pressure elements and around said sprocket wheels, grooves and projections upon said pressure elements and means for limiting the chains to rectilinear movement along one portion of the pressure elements, means for moving the pressure elements and sprocket wheels to and from each other, means for raising the article to be welded to welding temperature, and means for adjusting the tension of the chains.

40. In a tube welding machine the combination of two opposed elongated pressure elements mounted for movement to and from each other, a pair of sprocket wheels carried by each pressure element, one of the sprocket wheels of each of the pressure elements being movable longitudinally of said pressure elements and means for causing such movement, an endless chain mounted for cyclic movement upon the pressure elements and around the sprocket wheels, grooves and projections upon said pressure elements and chains for limiting the means to rectilinear movement along one portion of the pressure elements, means for moving the pressure elements and sprocket wheels to and from each other, and a torch for applying a welding flame to the tube.

41. In a tube welder, a cyclical moving holder for moving a tube forward, comprising two opposed adjustable pressure elements and endless chains carried by each pressure element for movement therewith as a whole and for cyclical movement thereon, in combination with a stationary burner arranged to play a flame upon the tube, and means for smoothing the roughened or raised seam caused by the welding flame.

42. In a tube welder, a cyclical moving holder for moving a tube forward, comprising two opposed adjustable pressure elements and an endless chain carried by each pressure element for movement therewith as a whole and cyclically thereon, in combination with a stationary burner arranged to play a flame upon the tube and weld the seam as fast as the tube travels, and a bur removing tool adapted to remove the raised seam or bur caused by the welding flame.

43. In a tube welding machine, two elongated pressure elements movable to and from each other, a cyclic vise carried by said pressure elements and comprising an endless chain mounted upon each pressure element for movement therewith as a whole and for cyclical movement thereon, and chains co-acting successively to grip and forward a tube, means for moving the pressure elements to and from each other, means for driving the endless chains, a welding torch arranged to direct a flame upon the tube in said vise, and means for smoothing the raised seam or removing the bur resulting from the welding operation.

44. In a tube welder, a cyclical moving holder for moving a tube forward, comprising two opposed elongated adjustable pressure elements movable to and from each other, an endless chain carried by each pressure element for movement as a whole therewith and cyclically thereon, means for presenting a tube to the moving holder, a welding torch positioned to play a flame upon the tube in the moving holder in combination with a tool positioned to act upon the tube after the welding operation and remove the raised seam or bur.

45. In a tube welding machine, the combination of a cylically moving holder for imparting longitudinal movement to a tube, means for presenting a tube to said cyclically moving holder, a welding torch positioned to play a flame upon and weld the tube, means for smoothing the tube after the welding operation and means for straightening the tube as it emerges from the tube forwarding and welding means.

46. In a tube welding machine, the combination of two opposed pressure elements, a cyclic chain mounted upon and carried by each of said pressure elements and co-acting longitudinally to forward a tube, means for moving said pressure elements to and from each other, a torch mounted over the vise and positioned to project a flame upon the tube, a bur removing tool arranged in the path of the tube and positioned at an angle to the longitudinal axis of the tube and means for straightening the tube as it emerges from the vise.

In testimony whereof, I have hereunto set my hand, this 20th day of October, 1913, in the presence of two subscribing witnesses.

MARSHALL BURNS LLOYD.

Witnesses:
 GEO. C. W. KLIPPEL,
 HILDA C. PETERSON.